G. L. CRANDAL,

Assignor of one-half to C. M. STONE and W. H. STONE.

CARRIAGE CURTAIN FASTENER.

~~No. 10,301.~~ Reissued Apr. 3, 1883.

Attest.

T. I. Sacey.

C. M. Underwood

Inventor.

Geo. L. Crandal

By Chas. M. Stone

Atty.

UNITED STATES PATENT OFFICE.

GEORGE L. CRANDAL, OF BINGHAMTON, NEW YORK, ASSIGNOR OF ONE-HALF TO CHARLES M. STONE AND WILLIAM H. STONE, OF SAME PLACE.

CARRIAGE-CURTAIN FASTENER.

SPECIFICATION forming part of Reissued Letters Patent No. 10,301, dated April 3, 1883.

Original No. 227,219, dated May 4, 1880. Application for reissue filed February 12, 1883.

*To all whom it may concern:*

Be it known that I, GEORGE L. CRANDAL, of Binghamton, in the county of Broome and State of New York, have invented certain new and useful Improvements in Carriage-Curtain Fasteners, of which the following is a specification.

My invention relates to carriage-curtain fasteners in which the button-hole is surrounded by binding-rings on opposite sides of the curtain, as in the Acker patent knob-eyelet, which I own by mesne assignments; and the object of my improvement is to employ binding-rings, constructed as hereinafter shown, for the purpose of securing a strap to the carriage-curtain, and by means of such strap, so secured and used in connection with a suitable fastening device, obtain a simple and cheap curtain-fastener, more especially for the curtains of wagon-bodies.

Figure 1:
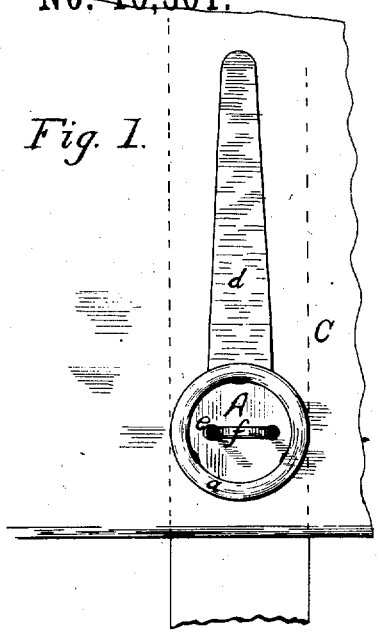
Figure 2:
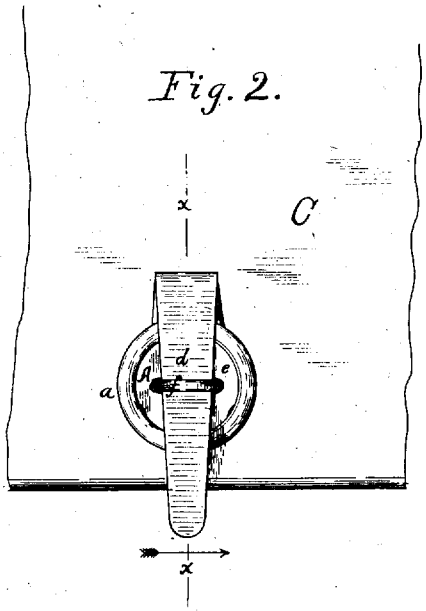
Figure 3:
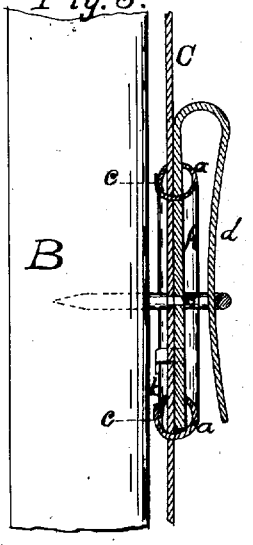
Figure 4:
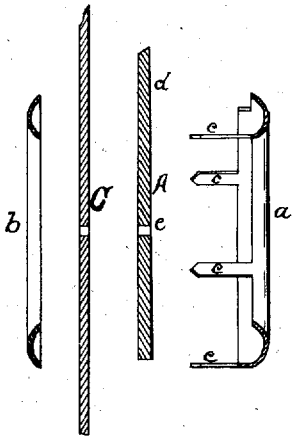
Figure 5:
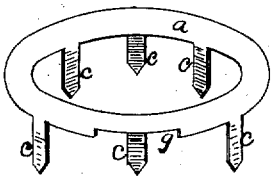

In the accompanying drawings, Figure 1 represents a front elevation of a carriage-curtain fastener embracing my invention, with the securing-strap opened; Fig. 2, a similar view with the securing-strap in position as fastening the curtain to the eyelet-staple; Fig. 3, a section of the same; Fig. 4, the parts of the eyelet, curtain, and securing-strap as separated; Fig. 5, the toothed eyelet-ring.

The button-hole piece A is bounded by outer and inner rings, *a b*, secured by clinching-points *c*, projecting from the inner and the outer edges of the outer ring and passing through the curtain C, and this button-hole piece has an integral strap continuation, *d*, the whole piece A *d* being bound and secured by the rings. A slit, *e*, in the button-hole piece and in the curtain passes over an eye or staple, *f*, secured to the bow B of the carriage or body of the wagon, and the strap is raised and brought through said eyebolt or staple, and the curtain thus fastened. The biting-edge of the outer ring, *a*, is cut away at the place *g*, Fig. 5, where it passes over the securing-strap, to permit of the flush lying of said ring upon the curtain. The button-hole piece or patch A not only is secured to the curtain by the ring-clinching points *c*, but the same manipulation also secures the fastening-strap *d* as a formed part of said patch, so that the latter requires no separate adjustment and fastening in applying the eyelet. The ring-clinching points in this way serve also as the strap-fastening points.

I claim—

1. In a carriage-curtain fastener, the button-hole piece or patch A and the fastening-strap *d*, of a single piece, in combination with the ring *a*, formed with circumferential biting-edge and inner and outer edge clinching-points, *c*, and the inner ring, *b*, the said inner-edge clinching-points passing through the said button-hole piece, and serving thereby to secure its integral fastening-strap for the carriage-bow eye, substantially as herein set forth.

2. In a carriage-curtain fastener, the combination, with the ring *a*, formed with circumferential biting edge and inner and outer edge clinching-points, *c*, and the inner ring, *b*, of the piece or patch A, and strap *d*, of a single piece, secured by said rings to the curtain, and adapted to engage with fastening devices upon the part of the carriage to be adjacent to the curtain, substantially as described.

3. In a carriage-curtain fastener, the combination, with the inner ring, *b*, of the outer ring, *a*, formed with circumferential biting-edge and inner and outer edge clinching-points, *c*, all of which points pass through the curtain, and are then clinched in opposite directions upon the ring *b*, substantially as described.

In testimony whereof I have hereunto set my hand in the presence of two subscribing witnesses.

GEO. L. CRANDAL.

Witnesses:
CHAS. E. TITCHENER,
N. H. SHORT.